US012674712B2

(12) United States Patent (10) Patent No.: US 12,674,712 B2
Hwang et al. (45) Date of Patent: Jul. 7, 2026

(54) SYSTEM FOR CALCULATING TEMPERATURE OF FLUID INSIDE PIPE BY USING HEAT FLUX, OUTER SURFACE TEMPERATURE OF PIPE, AND FLOW VELOCITY OF FLUID

(71) Applicant: KEPCO ENGINEERING & CONSTRUCTION COMPANY, INC., Gimcheon-si (KR)

(72) Inventors: Kyeong Mo Hwang, Gimcheon-si (KR); Il Su So, Gimcheon-si (KR); Gye Chul Cho, Gimcheon-si (KR)

(73) Assignee: KEPCO ENGINEERING & CONSTRUCTION COMPANY, INC., Gimcheon-si (KR)

( * ) Notice: Subject to any disclaimer, the term of this patent is extended or adjusted under 35 U.S.C. 154(b) by 446 days.

(21) Appl. No.: 18/093,692

(22) Filed: Jan. 5, 2023

(65) Prior Publication Data

US 2023/0221192 A1 Jul. 13, 2023

(30) Foreign Application Priority Data

Jan. 7, 2022 (KR) ......................... 10-2022-0002786

(51) Int. Cl.
*G01K 17/20* (2006.01)
(52) U.S. Cl.
CPC .................................... *G01K 17/20* (2013.01)
(58) Field of Classification Search
CPC ...... G01K 17/20; G01K 13/026; G01K 7/427; G01K 13/02; G01K 7/42
See application file for complete search history.

(56) References Cited

U.S. PATENT DOCUMENTS

2019/0219457 A1* 7/2019 Kimbell ................. G01K 13/02
2019/0293241 A1* 9/2019 Rud .......................... G01K 1/16

FOREIGN PATENT DOCUMENTS

CA        3088739 A1 * 7/2019 ........... F01D 17/085
CN     102628714 B  * 11/2018 ............... G01K 1/08
CN     210071177 U  *  2/2020 ........... F16L 3/1091
(Continued)

OTHER PUBLICATIONS

Tarawneh, C M, "Heat Transfer Equation Sheet", 2015, University of Texas Rio Grande Valley (Year: 2015).*
(Continued)

*Primary Examiner* — Tarun Sinha
*Assistant Examiner* — Julia Fitzpatrick
(74) *Attorney, Agent, or Firm* — NIXON PEABODY LLP; Jeffrey L. Costellia

(57) ABSTRACT

A system for calculating a temperature of a fluid inside a pipe by using a heat flux, an outer surface temperature of the pipe, and a flow velocity of the fluid includes a flow meter to measure the flow velocity of the fluid flowing inside the pipe, a heat flux meter to measure the heat flux passing through an outer surface of the pipe, a thermometer to measure the outer surface temperature of the pipe, and a calculator configured to calculate an internal fluid temperature, which is the temperature of the fluid flowing inside the pipe, by using the flow velocity of the fluid measured by the flow meter, the heat flux measured by the heat flux meter, and the outer surface temperature of the pipe measured by the thermometer.

5 Claims, 3 Drawing Sheets

(56)      References Cited

FOREIGN PATENT DOCUMENTS

| CN | 110967126 | A | * | 4/2020 | ............. G01K 1/143 |
| GB | 2559836 | A | * | 8/2018 | ........... G01F 1/6847 |
| JP | 2006010473 | A | * | 1/2006 | |
| JP | 2016161415 | A | * | 9/2016 | ............. G01F 1/684 |
| JP | 20170535757 | A | * | 3/2017 | |
| JP | 2019502930 | A | * | 1/2019 | |
| KR | 2014-0148091 | A | | 12/2014 | |
| TW | 201643383 | A | * | 12/2016 | ............. G01F 1/684 |
| WO | WO-2011069767 | A1 | * | 6/2011 | ............. G01K 17/06 |

OTHER PUBLICATIONS

Korean Office Action for App. No. 10-2022-0002786, dated Mar. 11, 2024 (7 pages).

* cited by examiner

FIG. 3

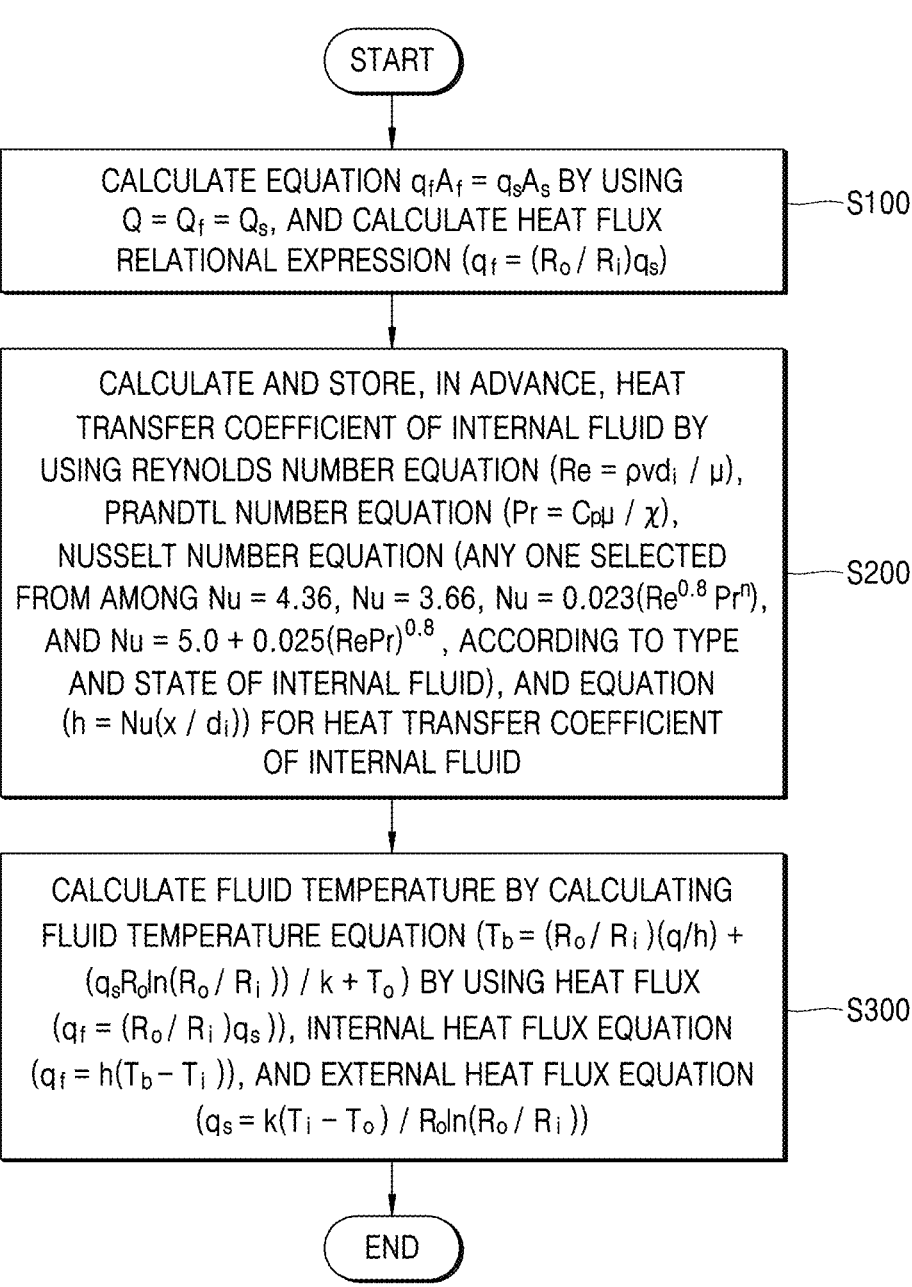

START

CALCULATE EQUATION $q_f A_f = q_s A_s$ BY USING $Q = Q_f = Q_s$, AND CALCULATE HEAT FLUX RELATIONAL EXPRESSION $(q_f = (R_o / R_i)q_s)$ ——S100

CALCULATE AND STORE, IN ADVANCE, HEAT TRANSFER COEFFICIENT OF INTERNAL FLUID BY USING REYNOLDS NUMBER EQUATION $(Re = \rho v d_i / \mu)$, PRANDTL NUMBER EQUATION $(Pr = C_p\mu / \chi)$, NUSSELT NUMBER EQUATION (ANY ONE SELECTED FROM AMONG $Nu = 4.36$, $Nu = 3.66$, $Nu = 0.023(Re^{0.8} Pr^n)$, AND $Nu = 5.0 + 0.025(RePr)^{0.8}$, ACCORDING TO TYPE AND STATE OF INTERNAL FLUID), AND EQUATION $(h = Nu(x / d_i))$ FOR HEAT TRANSFER COEFFICIENT OF INTERNAL FLUID ——S200

CALCULATE FLUID TEMPERATURE BY CALCULATING FLUID TEMPERATURE EQUATION $(T_b = (R_o / R_i)(q/h) + (q_s R_o \ln(R_o / R_i)) / k + T_o)$ BY USING HEAT FLUX $(q_f = (R_o / R_i)q_s)$, INTERNAL HEAT FLUX EQUATION $(q_f = h(T_b - T_i))$, AND EXTERNAL HEAT FLUX EQUATION $(q_s = k(T_i - T_o) / R_o \ln(R_o / R_i))$ ——S300

END

SYSTEM FOR CALCULATING TEMPERATURE OF FLUID INSIDE PIPE BY USING HEAT FLUX, OUTER SURFACE TEMPERATURE OF PIPE, AND FLOW VELOCITY OF FLUID

CROSS-REFERENCE TO RELATED APPLICATION

This application is based on and claims priority under 35 U.S.C. § 119 to Korean Patent Application No. 10-2022-0002786, filed on Jan. 7, 2022, in the Korean Intellectual Property Office, the disclosure of which is incorporated by reference herein in its entirety.

BACKGROUND

1. Field

The disclosure relates to a system for calculating the temperature of a fluid inside a pipe, and more particularly, to a system for calculating the temperature of a fluid inside a pipe by using a heat flux, the outer surface temperature of the pipe, and the flow velocity of the fluid, without installing a thermometer inside the pipe.

2. Description of the Related Art

In general, industrial facilities (e.g., power plants, factories, etc.) transport working fluids by using pipes. The temperature of a fluid flowing inside a pipe needs to be within an appropriate temperature range, and when the temperature of the fluid is out of a preset range, the pipe may be damaged due to high heat. Therefore, it is required to check whether the temperature of the fluid is within a preset temperature range, and when the temperature of the fluid is out of the preset temperature range, a certain action is taken, for example, a valve or the like is operated to change the flow rate of the fluid flowing through a flow path.

In addition to such actions, a method of measuring the temperature of a fluid flowing inside a pipe has been used. In the related art, a method of measuring the temperature of a fluid flowing inside a pipe by inserting and installing a thermometer into the pipe is used. Such a method requires drilling a hole on a pipe wall, installing a thermometer, and additionally installing a thermowell to protect the thermometer. However, the method of inserting and installing a thermometer into a pipe is disadvantageous in that the thermometer may be damaged as the fluid and the thermometer are in direct contact with each other, it is difficult to install the thermometer inside the pipe, and an extra cost is required for installing the thermowell in addition to the thermometer.

In particular, because it is impossible to insert a thermometer into a pipe having a small diameter (e.g., a straight pipe having a small diameter of 2 inches or less), it is difficult to measure the temperature of an internal fluid in a pipe having a small diameter. In addition, when a thermometer is installed inside a pipe through which a high-density fluid (e.g., a liquid metal) flows, the flow of the fluid may be disturbed, or the installed thermometer may be damaged by the fluid. In addition, when a thermometer is installed inside a significantly long pipe, the temperature of a fluid at a position far from the position at which the thermometer is installed is different from a temperature measured at the position of the thermometer as the temperature of the fluid changes due to heat from the outside of the pipe, and thus, the accurate temperature of the fluid in the pipe is not measured.

Therefore, it is necessary to develop a technique for easily measuring the temperature of a fluid flowing inside a pipe regardless of the size and length of the pipe and the type of the fluid flowing inside the pipe, with ease of installation of a thermometer, i.e., without requiring to install the thermometer inside the pipe, so as to prevent damage to the thermometer.

SUMMARY

Provided is a system for calculating the temperature of a fluid inside a pipe by using a heat flux, the outer surface temperature of the pipe, and the flow velocity of the fluid, without installing a thermometer inside the pipe.

Additional aspects will be set forth in part in the description which follows and, in part, will be apparent from the description, or may be learned by practice of the presented embodiments of the disclosure.

According to an aspect of the disclosure, a system for calculating a temperature of a fluid inside a pipe by using a heat flux, an outer surface temperature of the pipe, and a flow velocity of the fluid includes a flow meter to measure the flow velocity of the fluid flowing inside the pipe, a heat flux meter to measure the heat flux passing through an outer surface of the pipe, a thermometer to measure the outer surface temperature of the pipe, and a calculator configured to calculate an internal fluid temperature, which is the temperature of the fluid flowing inside the pipe, by using the flow velocity of the fluid measured by the flow meter, the heat flux measured by the heat flux meter, and the outer surface temperature of the pipe measured by the thermometer.

In addition, the calculator may be further configured to calculate the internal fluid temperature by using a calculation algorithm that is pre-trained on an internal fluid temperature equation $$T_b = \frac{R_o}{R_i}\frac{q_s}{h} + \frac{q_s R_o \ln(R_o/R_i)}{k} + T_o.$$

$T_b$ may denote the internal fluid temperature, $R_o$ may denote the radius of the outer diameter of the pipe, $R_i$ may denote the radius of the inner diameter of the pipe, $q_s$ may denote the heat flux passing through the outer surface of the pipe, h may denote a heat transfer coefficient of an internal fluid, k may denote the thermal conductivity of the pipe, and $T_o$ may denote the outer surface temperature of the pipe.

In addition, the calculation algorithm may calculate the internal fluid temperature equation by using a heat flux relational expression $$q_f = \left(\frac{R_o}{R_i}\right)q_s,$$

an internal heat flux equation $q_f = h(T_b - T_i)$, and an external heat flux equation $$q_s = k\frac{T_i - T_o}{R_o \ln(R_o/R_i)}.$$

$T_i$ may denote the inner surface temperature of the pipe and $q_f$ may denote a heat flux flowing from the internal fluid to the inner surface of the pipe.

In addition, the calculation algorithm may calculate the inner surface temperature equation $$T_i = \frac{q_s R_o \ln(R_o/R_i)}{k} + T_o$$

by rearranging the external heat flux equation $$q_s = k\frac{T_i - T_o}{R_o \ln(R_o/R_i)}$$

in terms of the inner surface temperature of the pipe. The calculation algorithm may calculate an intermediate fluid temperature equation $$T_b = \frac{q_f}{h} + \frac{q_s R_o \ln(R_o/R_i)}{k} + T_o$$

by using the inner surface temperature equation $$T_i = \frac{q_s R_o \ln(R_o/R_i)}{k} + T_o$$

and the internal heat flux equation $q_f = h(T_b - T_i)$, which is pre-trained. The calculation algorithm may calculate the internal fluid temperature equation by using the intermediate fluid temperature equation $$T_b = \frac{q_f}{h} + \frac{q_s R_o \ln(R_o/R_i)}{k} + T_o$$

and the calculated heat flux relational expression $$q_f = \left(\frac{R_o}{R_i}\right)q_s.$$

In addition, the calculation algorithm may calculate and store the heat transfer coefficient of the internal fluid in advance, by using an equation $$h = Nu\frac{x}{d_i}$$

for the heat transfer coefficient of the internal fluid, a Nusselt number equation, which is any one selected from among $Nu=4.36$, $Nu=3.66$, $Nu=0.023(Re^{0.9}Pr^n)$, and $Nu=5.0+0.025$ $(RePr)^{0.8}$, according to a type and a state of the internal fluid, a Reynolds number equation $$Re = \frac{\rho v d_i}{\mu},$$

and a Prandtl number equation $$pr = \frac{c_p \mu}{x}.$$

Nu may denote a Nusselt number, di may denote the diameter of the inner diameter of the pipe, $\chi$ may denote the thermal conductivity of the internal fluid, Re may denote a Reynolds number, Pr may denote a Prandtl number, $\rho$ may denote the density of the internal fluid, v may denote a flow velocity inside the pipe, $\mu$ may denote a viscosity coefficient of the internal fluid, and $C_P$ may denote the specific heat of the internal fluid.

In addition, the calculation algorithm may calculate the heat transfer coefficient of the internal fluid by applying $Nu=4.36$ when the internal fluid flowing inside the pipe is a laminar flow and a magnitude of a heat flux discharged to the outside of the pipe is constant, applying $Nu=3.66$ when the internal fluid flowing inside the pipe is a laminar flow and the outer surface temperature of the pipe is constant, applying $Nu=0.023(Re^{0.8}Pr^n)$ when the internal fluid flowing inside the pipe is a turbulent flow, applying $Nu=5.0\div0.025$ $(RePr)^{0.8}$, when the internal fluid flowing inside the pipe is a liquid metal, applying $n=0.4$ when a temperature of the pipe is greater than an external temperature of the pipe, and applying $n=0.3$ when the temperature of the pipe is less than the external temperature of the pipe.

In addition, the system for calculating a temperature of a fluid inside a pipe by using a heat flux, an outer surface temperature of the pipe, and a flow velocity of the fluid may further include a determination module configured to determine whether the internal fluid temperature calculated by the calculator is within a preset temperature range between a first temperature and a second temperature, and a processor configured to, when the internal fluid temperature determined by the determination module is out of the preset temperature range, control the internal fluid temperature to be maintained within the preset temperature range.

In addition, the system for calculating a temperature of a fluid inside a pipe by using a heat flux, an outer surface temperature of the pipe, and a flow velocity of the fluid may further include a heating module configured to, when the determination module determines that the internal fluid temperature is less than the first temperature, increase the internal fluid temperature under control by the processor.

In addition, the system for calculating a temperature of a fluid inside a pipe by using a heat flux, an outer surface temperature of the pipe, and a flow velocity of the fluid may further include a cooling module configured to, when the determination module determines that the internal fluid temperature is greater than the second temperature, reduce the internal fluid temperature under control by the processor.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3 is a flowchart illustrating a process, performed by a calculation algorithm, of calculating the temperature of an internal fluid, in the system for calculating the temperature of a fluid inside a pipe, according to an embodiment.

DETAILED DESCRIPTION

Figure 1:
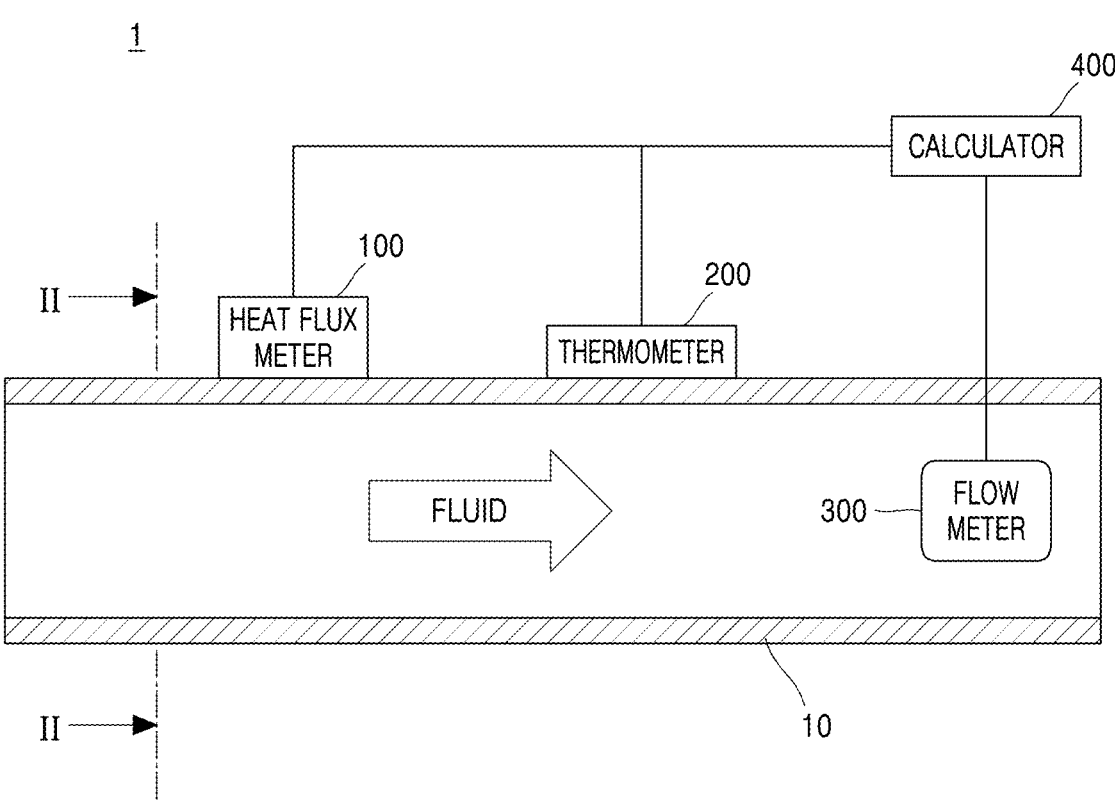
FIG. 1 is a diagram schematically illustrating a system for calculating the temperature of a fluid inside a pipe, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

Although the terms used in describing embodiments are selected from among common terms that are currently widely used in consideration of their function in the disclosure, the terms may be different according to an intention of one of ordinary skill in the art, a precedent, or the advent of new technology. Also, in particular cases, the terms are discretionally selected by the applicant of the disclosure, in which case, the meaning of those terms will be described in detail in the corresponding part of the detailed description. Therefore, the terms used herein are not merely designations of the terms, but the terms are defined based on the meaning of the terms and content throughout the disclosure.

As used in various embodiments, the expressions "include", "may include", and other conjugates refer to the existence of a corresponding disclosed function, operation, or constituent element, and do not limit one or more additional functions, operations, or constituent elements. In addition, as used in various embodiments, the terms "include", "have", and other conjugates are intended merely to denote a certain feature, numeral, step, operation, element, component, or a combination thereof, and should not be construed to initially exclude the existence of or a possibility of addition of one or more other features, numerals, steps, operations, elements, components, or combinations thereof.

It should be understood that, when it is described that an element is "connected" to another element, the first element may be directly connected to the second element, and a third element may be "connected" between the first and second elements. On the other hand, it should be understood that, when it is described that a first element is "directly connected" to a second element, no further element is present between the first element and the second element.

The terms used in various embodiments are used only to describe a particular embodiment, and are not intended to limit the various embodiments. A singular expression may include a plural expression unless they are definitely different in a context.

Unless otherwise defined, all terms, including technical and scientific terms, used herein have the same meaning as commonly understood by those of skill in the art to which the disclosure pertains based on an understanding of the disclosure.

Hereinafter, embodiments will be described in detail with reference to the accompanying drawings to allow those of skill in the art to easily carry out the embodiments. The disclosure may, however, be embodied in many different forms and should not be construed as being limited to the embodiments set forth herein.

Figure 2:
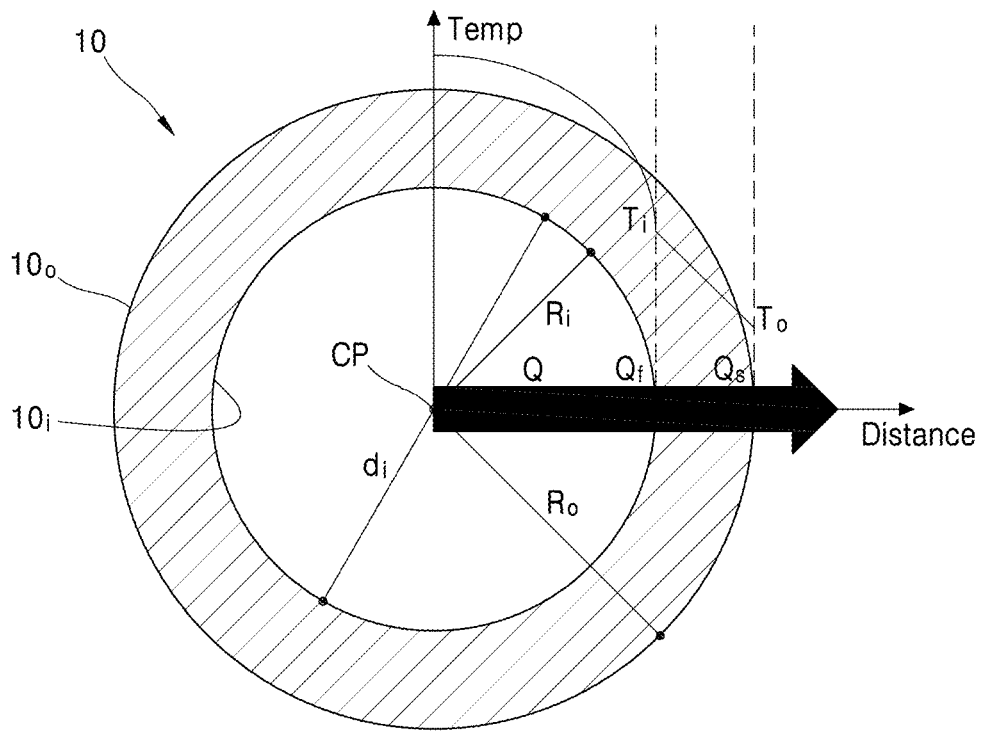
FIG. 2 is a cross-sectional view taken along line II-II of FIG. 1, illustrating a heat flux passing through the inner and outer surfaces of the pipe and the temperature gradient between the inner and outer surfaces of the pipe.

FIG. 1 is a diagram schematically illustrating a system for calculating the temperature of a fluid inside a pipe, according to an embodiment, FIG. 2 is a cross-sectional view taken along line II-II of FIG. 1, illustrating a heat flux passing through the inner and outer surfaces of the pipe and the temperature gradient between the inner and outer surfaces of the pipe, and FIG. 3 is a flowchart illustrating a process, performed by a calculation algorithm, of calculating the temperature of an internal fluid, in the system for calculating the temperature of a fluid inside a pipe, according to an embodiment.

Referring to FIGS. 1 to 3, a system 1 for calculating the temperature of a fluid inside a pipe according to an embodiment includes a heat flux meter 100, a thermometer 200, a flow meter 300, and a calculator 400. However, the components of the system 1 for calculating the temperature of a fluid inside a pipe according to an embodiment are not limited thereto, and other components according to an embodiment may be added or at least one component may be omitted.

Referring to FIGS. 1 to 3, the system 1 for calculating the temperature of a fluid inside a pipe according to an embodiment is used to calculate an internal fluid temperature $T_b$ of a fluid flowing inside a pipe 10, by using a heat flux $q_s$ passing through an outer surface 10$_o$ of the pipe 10, an outer surface temperature $T_o$ of the pipe 10, and a flow velocity v of the fluid.

To this end, the system 1 for calculating the temperature of a fluid inside a pipe according to an embodiment includes the flow meter 300 for measuring the flow velocity v of the fluid flowing inside the pipe 10, the heat flux meter 100 for measuring the heat flux $q_s$ passing through the outer surface 10$_o$ of the pipe 10, the thermometer 200 for measuring the outer surface temperature $T_o$ of the pipe 10, and the calculator 400 for calculating the internal fluid temperature $T_b$ by using the flow velocity v of the fluid measured by the flow meter 300, the heat flux $q_s$ measured by the heat flow meter 100, and the outer surface temperature $T_o$ of the pipe 10 measured by the thermometer 200.

Accordingly, the system 1 for calculating the temperature of a fluid inside a pipe according to an embodiment may improve the ease of installation as the thermometer 200 does not need to be directly installed inside the pipe 10, prevent damage to the thermometer 200 as the thermometer 200 is not in direct contact with the internal fluid flowing inside the pipe 10, easily obtain the internal fluid temperature $T_b$ without directly measuring the temperature of the inside of the pipe 10, and obtain the temperature of a fluid inside even a pipe having a small diameter in which a thermometer cannot be installed.

In addition, the system for calculating the temperature of a fluid inside a pipe by using a heat flux, the outer surface temperature of the pipe, and the flow velocity of the fluid according to an embodiment is advantageous in that it is capable of measuring the temperature of a high-density fluid regardless of the type of internal fluid, and that it does not require welding, coupling, or the like of a heat flux meter and an outer surface thermometer regardless of the type of pipe and thus the temperature of an internal fluid may be measured at any position where the temperature is to be measured.

Hereinafter, the heat flux meter 100, the thermometer 200, the flow meter 300, and the calculator 400 will be described in detail with reference to the accompanying drawings.

Referring to FIGS. 1 and 2, the heat flux meter 100 measures the heat flux $q_s$ passing through the outer surface 10$_o$ of the pipe 10. The heat flux is the amount of heat passing per unit area and unit time, and may be in units of W/m². Watt (W) may also be expressed as Joule (J)/s. The heat flux meter 100 may be installed on the outer surface 10$_o$ of the pipe 10, and may provide information about the measured heat flux $q_s$ to the calculator 400.

Referring to FIGS. 1 and 2, the thermometer 200 measures the outer surface temperature $T_o$ of the pipe 10. The thermometer 200 may be installed on the outer surface 10$_o$ of the pipe 10, and may provide information about the measured outer surface temperature $T_o$ of the pipe 10 to the calculator 400. The system 1 for calculating the temperature of a fluid inside a pipe according to an embodiment does not directly measure an inner surface temperature $T_i$ of the pipe 10, but may calculate the internal fluid temperature $T_b$ by only measuring the outer surface temperature $T_o$, and thus is advantageous in that it is able to easily obtained the internal fluid temperature $T_b$. The unit of the outer surface temperature $T_o$ may be ° C.

In the graph shown in FIG. 2, the x axis represents the distance from a center CP of the pipe 10, and the y axis represents the temperature with respect to the center CP of the pipe 10. As may be seen from FIG. 2, the temperature is highest at the center CP of the pipe 10 and decreases as the distance from the center CP of the pipe 10 increases. That is, the temperature of an inner surface 10$_i$ of the pipe 10 is greater than that of the outer surface 10$_o$ of the pipe 10.

Referring to FIGS. 1 and 2, the flow meter 300 measures the flow velocity v of the internal fluid flowing inside the pipe 10. The flow meter 300 may be installed inside the pipe 10 and may provide the measured flow velocity v of the internal fluid to the calculator 400. The flow velocity v of the internal fluid measured by the flow meter 300 may be used by a calculation algorithm to be described below to calculate a heat transfer coefficient h of the internal fluid. The unit of the flow velocity v of the internal fluid may be m/s.

Referring to FIGS. 1 and 2, the calculator 400 calculates the internal fluid temperature $T_b$ of the fluid flowing inside the pipe 10, by using the flow velocity v of the internal fluid measured by the flow meter 300, the heat flux $q_s$ measured by the heat flux meter 100, and the outer surface temperature $T_o$ of the pipe 10 measured by the thermometer 200.

The calculator 400 includes a calculation algorithm for calculating the internal fluid temperature $T_b$. The calculation algorithm is pre-trained based on a plurality of equations, stores the plurality of equations, and thus provides rules for calculating the internal fluid temperature $T_b$.

The calculation algorithm calculates the internal fluid temperature $T_b$ by using the following internal fluid temperature equation.

Internal Fluid Temperature Equation $$T_b = \frac{R_o}{R_i}\frac{q_s}{h} + \frac{q_s R_o \ln(R_o/R_i)}{k} + T_o$$

Here, $T_b$ denotes the internal fluid temperature (unit: ° C.), $R_o$ denotes the radius of the outer diameter of the pipe (unit: m), $R_i$ denotes the radius of the inner diameter of the pipe (unit: m), $q_s$ denotes the heat flux passing through the outer surface of the pipe (unit: W/m²), h denotes the heat transfer coefficient of the internal fluid (unit: W/m²° C.), k denotes the thermal conductivity of the pipe (unit: W/m° C.), and $T_o$ denotes the outer surface temperature of the pipe (unit: ° C.).

As may be seen from the above internal fluid temperature equation, the calculation algorithm may calculate the internal fluid temperature $T_b$ without information about the inner surface temperature $T_i$ of the pipe 10.

The calculation algorithm may calculate the internal fluid temperature equation by using the following heat flux equation, internal heat flux equation, and external heat flux equation.

Heat Flux Equation $$q_f = \left(\frac{R_o}{R_i}\right)q_s$$

Internal Heat Flux Equation $$q_f = h(T_b - T_i)$$

External Heat Flux Equation $$q_s = k\frac{T_i - T_o}{R_o \ln(R_o/R_i)}$$

Here, $T_i$ denotes the inner surface temperature of the pipe (unit: ° C.), and $q_f$ denotes the heat flux flowing from the internal fluid to the inner surface of the pipe (unit: W/m²).

The calculation algorithm may calculate and store the heat transfer coefficient of the internal fluid in advance by using the following equation for the heat transfer coefficient of the internal fluid, Nusselt number equation, Reynolds number equation, and Prandtl number equation.

Equation for Heat Transfer Coefficient of Internal Fluid $$h = Nu\frac{x}{d_i}$$

The Nusselt number equation may be selected from among the following equations, depending on the type and state (laminar flow or turbulent flow) of the internal fluid.

Nu=4.36 (when the internal fluid flowing inside the pipe 10 is a laminar flow and the magnitude of the heat flux discharged to the outside of the pipe 10 is constant), Nu=3.66 (when the internal fluid flowing inside the pipe 10 is a laminar flow and the outer surface temperature of the pipe 10 is constant), Nu=0.023(Ru$^{0.8}$Pr$^n$) (when the internal fluid flowing inside the pipe 10 is a turbulent flow), Nu=5.0+0.025(RePr)$^{0.8}$, (when the internal fluid flowing inside the pipe 10 is a liquid metal).

Here, laminar flow refers to a regular flow of a fluid in which the fluid flows in layers that are hardly mixed with each other, and turbulent flow refers to a flow of a fluid in which each part of the fluid flows with irregular movements in time or space.

Reynolds Number Equation $$Re = \frac{\rho v d_i}{\mu}$$

Prandtl Number Equation $$pr = \frac{c_p \mu}{x}$$

Here, Nu denotes a Nusselt number (dimensionless), $d_i$ denotes the diameter of the inner diameter of the pipe (unit: m), $\chi$ denotes the thermal conductivity of the internal fluid (unit: W/m° C.), Re denotes a Reynolds number (dimensionless), Pr denotes a Prandtl number (dimensionless), p denotes the density of the internal fluid (unit: kg/m³), v denotes the flow velocity inside the pipe (unit: m/s), $\mu$ denotes the viscosity coefficient of the internal fluid (unit: Ns/m²), and $C_P$ denotes the specific heat of the internal fluid (unit: J/kg° C.).

The Nusselt number is a dimensionless value representing the ratio of heat transfer between a fluid and a solid surface, and as the Nusselt number increases, the effect of molecular motion on the rate of thermal conduction decreases. The Reynolds number is a dimensionless value that serves as the boundary between a turbulent flow and a laminar flow when an object is placed in a moving fluid or when a fluid flows through a pipe. The Prandtl number is a dimensionless value that approximates the ratio between the viscosity and thermal diffusivity of a fluid.

According to an embodiment, when the type and size of the pipe 10 is changed or the state (e.g., density, flow velocity, temperature, etc.) of the internal fluid is changed, the calculation algorithm may calculate the heat transfer coefficient h of the internal fluid based on the changed state and reflects the heat transfer coefficient h in the internal fluid temperature equation, and thus, the accuracy of an operation of calculating the internal fluid temperature $T_b$ may be improved.

For example, the Nusselt number equation may be selected by the user according to the type and state of the internal fluid flowing inside the pipe 10 and then input to the calculation algorithm. As another example, a machine learning model may be trained based on the Nusselt number equation according to the type and state of the internal fluid flowing inside the pipe 10, and then input to the calculation algorithm. In a case in which the internal fluid is a laminar flow and the magnitude of the heat flux discharged to the outside of the pipe 10 is constant, Nu=4.36 may be selected as the Nusselt number equation, and when the internal fluid is a laminar flow and the measured outer surface temperature of the pipe 10 is constant, Nu=3.66 may be selected as the Nusselt number equation. In a case in which the internal fluid is a turbulent flow, Nu=0.023($\text{Re}^{0.8}\text{Pr}^n$) may be selected as the Nusselt number equation. Here, when the temperature of the pipe 10 is greater than the external temperature of the pipe 10, n may be 0.4, and when the temperature of the pipe 10 is less than the external temperature of the pipe 10, n may be 0.3. That is, when heat is discharged to the outside of the pipe 10, n=0.4 is applied, and when heat is introduced into the pipe 10, n=0.3 is applied. In addition, when the internal fluid flowing inside the pipe 10 is a liquid metal, Nu=5.0+0.025($\text{RePr}$)$^{0.8}$ may be selected.

The system 1 for calculating the temperature of a fluid inside a pipe according to an embodiment may calculate the heat transfer coefficient h of the internal fluid by using the Nusselt number Nu changed according to the type and state of the internal fluid and the external temperature of the pipe 10, and thus, the accuracy of the operation of calculating the internal fluid temperature $T_b$ may be improved. The temperature of the pipe 10 may be an intermediate value between the inner surface temperature $T_i$ and the outer surface temperature $T_o$ of the pipe 10.

Hereinafter, a process of calculating the internal fluid temperature $T_b$ by using equations stored in the calculation algorithm will be described with reference to FIGS. 2 and 3.

First, heat Q moves from the internal fluid to the inner surface 101 of the pipe 10, then passes through the wall between the inner surface $10_i$ of the pipe 10 and the outer surface $10_o$ of the pipe 10, and then moves to the outer surface $10_o$ of the pipe 10. The bold arrow in FIG. 2 schematically shows the heat passing through the inner surface 101 and the outer surface $10_o$ of the pipe 10. In a case in which there is no heat loss during the movement of the heat flux, Equation 1 below is satisfied.

$$Q=Q_f=Q_s$$

Here, $Q_f$ denotes the amount of heat flowing from the internal fluid to the inner surface $10_i$ of the pipe 10 (unit: W), and $Q_s$ denotes the amount of heat flowing from the inner surface $10_i$ of the pipe 10 through the wall of the pipe 10 to the outer surface $10_o$ of the pipe 10 (unit: W).

The calculation algorithm calculates Equation 2 below by applying Equation 1 as the heat flux.

$$q_f A_f = q_s A_s$$

Here, $A_f$ denotes the area of the inner surface $10_i$ of the pipe 10 through which the heat flux $q_f$ passes, and $A_s$ denotes the area of the outer surface $10_o$ of the pipe 10 through which the heat flux $q_s$ passes.

The calculation algorithm calculates a heat flux relational expression $$q_f = \left(\frac{R_o}{R_i}\right)q_s$$

by applying Equation 2 as the radius $R_i$ of the inner diameter and the radius $R_o$ of the outer diameter of the pipe 10 (S100). As may be seen from the heat flux relational expression, the heat flux $q_f$ flowing from the internal fluid to the inner surface $10_i$ of the pipe 10 may vary depending on the diameter ratio ($R_o/R_i$) of the pipe 10.

Next, the calculation algorithm may calculate and store the heat transfer coefficient h of the internal fluid in advance (S200). In operation S200, the calculation algorithm calculates the Reynolds number Re by using the Reynolds number equation $$Re = \frac{\rho v d_i}{\mu},$$

calculates the Prandtl number Pr by using the Prandtl number equation $$pr = \frac{c_p \mu}{x},$$

and calculates the Nusselt number Nu by using the Nusselt number equation Nu=0.023($\text{Re}^{0.8}\text{Pr}^n$). Thereafter, the calculation algorithm calculates and stores the heat transfer coefficient h of the internal fluid by using the equation $$h = Nu\frac{x}{d_i}$$

for the heat transfer coefficient of the internal fluid.

In operation S200, the calculation algorithm may apply n=0.4 to the Nusselt number equation when the temperature of the pipe 10 is greater than the external temperature of the pipe 10, and may apply n=0.3 to the Nusselt number equation when the temperature of the pipe 10 is less than the external temperature of the pipe 10.

According to an embodiment, any one of operations S100 and S200 may be performed first and then the other may be sequentially performed, or operations S100 and S200 may be performed in parallel.

Next, the calculation algorithm calculates the internal fluid temperature $T_b$ by using the internal fluid temperature equation $$T_b = \frac{R_o}{R_i}\frac{q_s}{h} + \frac{q_s R_o \ln(R_o/R_i)}{k} + T_o$$

(S300). A process, performed by the calculation algorithm, of calculating the internal fluid temperature $T_b$ by using the internal fluid temperature equation is as follows.

The heat flux $q_f$ transferred to the inner surface 101 of the pipe 10 through convection may be expressed as the heat flux $q_s$ passing through the outer surface 10$_o$ of the pipe 10, according to the heat flux relational expression $$q_f = \left(\frac{R_o}{R_i}\right)q_s.$$

The heat flux flowing from the inner surface 10$_i$ of the pipe 10 to the outer surface 10$_o$ of the pipe 10 is made through conduction, and as may be seen from the external heat flux equation $$q_s = k\frac{T_i - T_o}{R_o \ln(R_o/R_i)}$$

learned by and stored in the calculation algorithm in advance, the difference between the outer surface temperature $T_o$ of the pipe 10 and the inner surface temperature $T_i$ of the pipe 10 is relevant to the heat flux $q_s$ flowing out of the pipe 10.

By rearranging the external heat flux equation $$q_s = k\frac{T_i - T_o}{R_o \ln(R_o/R_i)}$$

in terms of the inner surface temperature $T_i$ of the pipe 10, the inner surface temperature equation $$T_i = \frac{q_s R_o \ln(R_o/R_i)}{k} + T_o$$

is calculated. By applying the previously learned and stored internal heat flux equation $q_f = h(T_b - T_i)$ to the inner surface temperature equation and rearranging it, an intermediate fluid temperature equation $$T_b = \frac{q_f}{h} + \frac{q_s R_o \ln(R_o/R_i)}{k} + T_o$$

is calculated. By the calculated heat flux relational expression $$q_f = \left(\frac{R_o}{R_i}\right)q_s$$

to the intermediate fluid temperature equation and rearranging it, the internal fluid temperature equation $$T_b = \frac{R_o}{R_i}\frac{q_s}{h} + \frac{q_s R_o \ln(R_o/R_i)}{k} + T_o$$

is finally calculated.

As may be seen from the internal fluid temperature equation $$T_b = \frac{R_o}{R_i}\frac{q_s}{h} + \frac{q_s R_o \ln(R_o/R_i)}{k} + T_o,$$

the internal fluid temperature $T_b$ flowing inside the pipe 10 may be calculated by using the heat flux $q_s$ passing through the outer surface 10$_o$ of the pipe 10, the heat transfer coefficient h of the internal fluid, and the outer surface temperature $T_o$ of the pipe 10.

Here, the heat flux $q_s$ passing through the outer surface 10$_o$ of the pipe 10 may be measured by using the heat flux meter 100, the outer surface temperature $T_o$ of the pipe 10 may be measured by using the thermometer 200, and the heat transfer coefficient h of the internal fluid may be calculated by using the flow velocity v measured by the flow meter 300.

Thus, the system 1 for calculating the temperature of a fluid inside a pipe according to an embodiment may be implemented in a structure that may easily calculate the internal fluid temperature $T_b$ by using easily measurable variables without directly measuring the inner surface temperature $T_i$ of the pipe 10.

According to an embodiment, the internal fluid may flow inside the pipe 10 at a temperature within a preset temperature range. $T_o$ this end, the system 1 for calculating the temperature of a fluid inside a pipe according to an embodiment may include a determination module, a heating module, a cooling module, and a processor.

The determination module determines whether the internal fluid temperature $T_b$ calculated by the calculator 400 is within the preset temperature range, which is between a first temperature and a second temperature. The preset temperature range may be input to and stored in the processor in advance, and may refer to a temperature range within which the pipe 10 is not damaged. For example, the preset temperature range may be about 50° C. to about 300° C.

The heating module is provided in the pipe 10 to increase the temperature of the internal fluid. The heating module may increase the temperature of the internal fluid by increasing the temperature of the pipe 10, or may directly increase the temperature of the internal fluid. The heating module may also increase the temperature of the internal fluid by supplying a high-temperature fluid to the pipe 10.

The cooling module is provided in the pipe 10 to reduce the temperature of the internal fluid. The cooling module may reduce the temperature of the internal fluid by reducing the temperature of the pipe 10, or may directly reduce the temperature of the internal fluid. The heating module may reduce the temperature of the internal fluid by supplying a cooled fluid to the pipe 10.

The processor controls the overall operation of the system 1 for calculating the temperature of a fluid inside a pipe according to an embodiment. When the internal fluid temperature $T_b$ calculated by the calculator 400 is out of the preset range and is greater than the first temperature, the processor may control the cooling module to reduce the temperature of the internal fluid. When the internal fluid temperature $T_b$ calculated by the calculator 400 is out of the preset range and is less than the second temperature, the processor may control the heating module to increase the temperature of the internal fluid.

As such, in the system 1 for calculating the temperature of a fluid inside a pipe according to the embodiment, the calculator 400, in addition to simply calculating the internal fluid temperature $T_b$, may also control the internal fluid temperature $T_b$ such that the fluid flowing inside the pipe 10 has a temperature within an appropriate range by using the calculated internal fluid temperature $T_b$.

The processor may be implemented as an array of a plurality of logic gates, or may be implemented as a combination of a general-purpose microprocessor and a memory storing a program executable by the microprocessor. In addition, those of skill in the art to which the present embodiment pertains may understand that the processor may be implemented in other types of hardware.

It will be understood by those of skill in the art that the disclosure may be implemented in a modified form without departing from the intrinsic characteristics of the descriptions provided above. Therefore, the disclosed methods are to be considered in a descriptive sense only, and not for purposes of limitation. The scope of the disclosure is in the claims rather than the above descriptions, and all differences within the equivalent scope should be construed as being included in the disclosure.

As described above, the system for calculating the temperature of a fluid inside a pipe by using a heat flux, the outer surface temperature of the pipe, and the flow velocity of the fluid according to an embodiment does not require to install a thermometer inside the pipe, thereby improving the ease of installation, and is able to obtain the temperature of a fluid inside even a pipe having a small diameter in which a thermometer cannot be installed.

In addition, the system for calculating the temperature of a fluid inside a pipe by using a heat flux, the outer surface temperature of the pipe, and the flow velocity of the fluid according to an embodiment is advantageous in that it is capable of measuring the temperature of a high-density fluid regardless of the type of internal fluid, and that it does not require welding, coupling, or the like of a heat flux meter and an outer surface thermometer regardless of the type of pipe and thus the temperature of an internal fluid may be measured at any position where the temperature is to be measured.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A system for calculating a temperature of a fluid inside a pipe by using a heat flux, an outer surface temperature of the pipe, and a flow velocity of the fluid, the system comprising:

a flow meter to measure the flow velocity of the fluid flowing inside the pipe;

a heat flux meter to measure the heat flux passing through an outer surface of the pipe, wherein the heat flux meter is disposed on an outer surface of the pipe;

a thermometer to measure the outer surface temperature of the pipe, wherein the thermometer is disposed on an outer surface of the pipe;

a calculator configured to calculate an internal fluid temperature, which is the temperature of the fluid flowing inside the pipe, by using the flow velocity of the fluid measured by the flow meter, the heat flux measured by the heat flux meter, and the outer surface temperature of the pipe measured by the thermometer;

a determination module configured to determine whether the internal fluid temperature calculated by the calculator is within a preset temperature range between a first temperature and a second temperature; and a processor configured to, when the internal fluid temperature determined by the determination module is out of the preset temperature range, control the internal fluid temperature to be maintained within the preset temperature range, wherein the calculator is further configured to calculate the internal fluid temperature by using a calculation algorithm that is pre-trained based on an internal fluid temperature equation $$T_b = \frac{R_o}{R_i} \frac{q_s}{h} + \frac{q_s R_o \ln\left(R_o/R_i\right)}{k} + T_o$$

wherein $T_b$ denotes the internal fluid temperature, $R_o$ denotes a radius of an outer diameter of the pipe, $R_i$ denotes a radius of an inner diameter of the pipe, $q_s$ denotes the heat flux passing through the outer surface of the pipe, h denotes a heat transfer coefficient of an internal fluid, k denotes thermal conductivity of the pipe, and $T_o$ denotes the outer surface temperature of the pipe, wherein the calculation algorithm calculates and stores the heat transfer coefficient of the internal fluid in advance, by using an equation $$h = Nu \frac{x}{d_i}$$

for the heat transfer coefficient of the internal fluid, a Nusselt number equation, which is any one selected from among $Nu=4.36$, $Nu=3.66$, $Nu=0.023(Re^{0.8}Pr^n)$, and $Nu=5.0+0.025$ $(RePr)^{0.8}$ according to a type and a state of the internal fluid, a Reynolds number equation $$Re = \frac{\rho v d_i}{\mu},$$

and a Prandtl number equation $$pr = \frac{c_p \mu}{x},$$

wherein Nu denotes a Nusselt number, $d_i$ denotes a diameter of the inner diameter of the pipe, $\chi$ denotes thermal conductivity of the internal fluid, Re denotes a Reynolds number, Pr denotes a Prandtl number, $\rho$ denotes density of the internal fluid, v denotes a flow velocity inside the pipe, $\mu$ denotes a viscosity coefficient of the internal fluid, and $C_p$ denotes specific heat of the internal fluid, and wherein the calculation algorithm calculates the heat transfer coefficient of the internal fluid by applying Nu=4.36 when the internal fluid flowing inside the pipe is a laminar flow and a magnitude of a heat flux discharged to the outside of the pipe is constant, applying Nu=3.66 when the internal fluid flowing inside the pipe is a laminar flow and the outer surface temperature of the pipe is constant, applying Nu=0.023 ($Re^{0.8}Pr^n$) when the internal fluid flowing inside the pipe is a turbulent flow, applying Nu=5.0+0.025 $(RePr)^{0.8}$ when the internal fluid flowing inside the pipe is a liquid metal, applying n=0.4 when a temperature of the pipe is greater than an external temperature of the pipe, and applying n=0.3 when the temperature of the pipe is less than the external temperature of the pipe.

2. The system of claim 1, wherein the calculation algorithm calculates the internal fluid temperature equation by using a heat flux relational expression $$q_f = \left(\frac{R_o}{R_f}\right)q_s,$$

an internal heat flux equation $q_f = h(T_b - T_t)$, and an external heat flux equation $$q_s = k\frac{T_i - T_o}{R_o \ln(R_o/R_i)}$$

wherein $T_i$ denotes the inner surface temperature of the pipe and $q_f$ denotes a heat flux flowing from the internal fluid to an inner surface of the pipe.

3. The system of claim 2, wherein the calculation algorithm calculates the inner surface temperature equation $$T_i = \frac{q_s R_o \ln(R_o/R_i)}{k} + T_o$$

by rearranging the external heat flux equation $$q_s = k\frac{T_i - T_o}{R_o \ln(R_o/R_i)}$$

in terms of the inner surface temperature of the pipe, calculates an intermediate fluid temperature equation $$T_b = \frac{q_f}{h} + \frac{q_s R_o \ln(R_o/R_i)}{k} + T_o$$

by using the inner surface temperature equation $$T_i = \frac{q_s R_o \ln(R_o/R_i)}{k} + T_o$$

and the internal heat flux equation $q_f = h(T_b - T_t)$, which is pre-trained, and calculates the internal fluid temperature equation by using the intermediate fluid temperature equation $$T_b = \frac{q_f}{h} + \frac{q_s R_o \ln(R_o/R_i)}{k} + T_o$$

and the calculated heat flux relational expression $$q_f = \left(\frac{R_o}{R_i}\right)q_s.$$

4. The system of claim 1, further comprising a heating module configured to, when the determination module determines that the internal fluid temperature is less than the first temperature, increase the internal fluid temperature under control by the processor.

5. The system of claim 1, further comprising a cooling module configured to, when the determination module determines that the internal fluid temperature is greater than the second temperature, reduce the internal fluid temperature under control by the processor.

\* \* \* \* \*